US010021318B2

(12) United States Patent
Hugosson et al.

(10) Patent No.: US 10,021,318 B2
(45) Date of Patent: Jul. 10, 2018

(54) METHOD AND APPARATUS IN A MOTION VIDEO CAPTURING SYSTEM (71) Applicant: Axis AB, Lund (SE)

(72) Inventors: Fredrik Hugosson, Lomma (SE); Ted Hartzell, Lomma (SE); Bjarne Rosengren, Södra Sandby (SE)

(73) Assignee: Axis AB, Lund (SE)

( * ) Notice: Subject to any disclaimer, the term of this patent is extended or adjusted under 35 U.S.C. 154(b) by 205 days.

(21) Appl. No.: 14/535,009

(22) Filed: Nov. 6, 2014

(65) Prior Publication Data
US 2015/0138375 A1    May 21, 2015

(30) Foreign Application Priority Data

Nov. 21, 2013    (EP) ..................................... 13193889

(51) Int. Cl.
*H04N 5/247*    (2006.01)
*H04N 7/18*    (2006.01)
*H04N 7/01*    (2006.01)
*H04L 29/06*    (2006.01)
*H04L 12/28*    (2006.01)

(52) U.S. Cl.
CPC ........... *H04N 5/247* (2013.01); *H04L 12/283* (2013.01); *H04L 65/4084* (2013.01); *H04L 65/605* (2013.01); *H04N 7/0117* (2013.01); *H04N 7/181* (2013.01); *H04L 2012/2849* (2013.01)

(58) Field of Classification Search
CPC ...... H04N 5/247; H04N 7/0117; H04N 7/181; H04L 12/283; H04L 65/4084; H04L 65/605; H04L 2012/2849
See application file for complete search history.

(56) References Cited

U.S. PATENT DOCUMENTS

| 8,253,773 B2 * | 8/2012 | Jones ....................... H04N 7/18 348/14.02 |
| 2005/0060411 A1 | 3/2005 | Coulombe et al. |
| 2007/0220024 A1 | 9/2007 | Putterman et al. |
| 2010/0088292 A1 | 4/2010 | Tirpak et al. |

OTHER PUBLICATIONS

EP 13 19 3889.6 European Search Report (dated Apr. 24, 2014).

\* cited by examiner

*Primary Examiner* — Twyler Haskins
*Assistant Examiner* — Angel L Garces-Rivera
(74) *Attorney, Agent, or Firm* — Volpe and Koenig, P.C.

(57) ABSTRACT

A method for delivering motion video, which is captured by a first motion video camera, to a client device from said first motion video camera. The method comprises receiving, at the first motion video camera from the client, a request of a motion video and an indication of a requested format, matching, in a transcoding format list of the first motion video camera, the selected format to an address of a second motion video camera, sending, to said address of the second motion video camera, a motion video which have been identified in a request, the motion video having a format different from the selected format, receiving at the first motion video camera from the second motion video camera said requested motion video in the selected format, and sending said requested motion video in the selected format to the client.

10 Claims, 6 Drawing Sheets

METHOD AND APPARATUS IN A MOTION VIDEO CAPTURING SYSTEM

FIELD OF INVENTION

The present invention relates to a system for capturing and presenting motion video. According to one aspect the invention relates to methods and apparatuses in such a system including motion video cameras arranged to capture motion video for presentation on various client devices.

BACKGROUND

It is common to design systems including networked motion video cameras for various purposes. For instance may such a system be a surveillance system. The types of systems may be quite expensive systems and therefore are often individual motion video cameras added to existing systems instead of replacing all the motion video cameras in the system with new ones when the system have to be expanded. This is also true when one or a limited number of the motion video cameras in a system have to be replaced for one reason or another. The owner of the system would then rather replace an individual motion video camera than replacing all the motion video cameras. Moreover, the clients receiving the motion video data are often software implementations which are easily updated and are therefore also often updated. Hence, the user that wants to access data from an old motion video camera may experience difficulties presenting the data due to the client being restricted to presenting newer formats. One reason for restricting the formats that the client is able to present may be that the client device could be a device having limited resources, e.g. memory, bandwidth, CPU, resolution, etc., and therefore the client software is designed to only present some selected formats.

For instance there are plenty of different formats available for motion video as cameras may operate using different container formats, e.g. AVI (Audio Video Interleave), .mp4 (MPEG-4 Part 14), FLV (Flash Video), MOV (QuickTime container), OGG, OGM, OGV, MKV (Matroska), VOB (DVD Video Container), ASF, etc., using different encoding formats, e.g. MPEG-1, MPEG-2, MPEG-3, MJPEG, DV (Digital Video), H.264, H.265, WMV (Windows Media Video), RM (Real Media), DivX, QuickTime, Ogg, etc., capturing images at different frame rates, capturing images at different aspect ratios, capturing images at different image sizes, etc.

In the context of the present application a container format is a specification that describes the structure of a media file, e.g. where the various pieces are stored, how they are interleaved, and which codecs are used by which pieces. The container format may specify both a video codec and an audio codec. Further, in the context of the present application an encoding format is defining the method to be used to encode and decode the data, e.g. audio or video.

In these types of systems including networked motion video cameras of different types, age, brands, or features, the client is not necessarily able to decode and/or present all of the data formats delivered by the motion video cameras. Hence, when the user of the client accesses a particular motion video camera in order to examine the motion video data from the motion video camera it is possible that the client is unable to present the data due to restrictions in the client in view of the number of formats it is able to present.

SUMMARY

One object of the invention is to decrease the risk of a client not being able to present motion video content from a motion video camera.

The object is achieved by means of a method according to claim 1, by means of motion video camera according to claim 7. Further embodiments of the invention are presented in the dependent claims.

In particular, according to one aspect of the invention, a method for delivering motion video, which is captured by a first motion video camera, to a client device from said first motion video camera, comprises the acts of receiving at the first motion video camera from the client a request of a motion video and an indication of a requested format, matching, in a transcoding format list of the first motion video camera, the selected format to an address of a second motion video camera, sending, to said address of the second motion video camera, a motion video which have been identified in a request from the client device, the motion video having a format different from the selected format, receiving at the first motion video camera from the second motion video camera said requested motion video in the selected format, and sending said requested motion video in the selected format to the client.

One advantage of the above embodiment is that the capabilities, at least relating to providing different video formats, are increased. This increase is achieved without changing the operation of a client relating to accessing the motion video camera that captures/captured the motion video of interest. Another advantage is that the system may become distributed in view of transcoding. Thereby, the method also is enabling redundancy when it comes to transcoding. Another advantage is that the capabilities of a motion video camera may be extended without making great changes to the motion video camera and/or the client.

According to another embodiment the receiving at the first motion video camera from the client includes receiving the request of a motion video in a first request and the indication of a requested format in a second request. The embodiment further comprises sending, in response to receiving the first request, a format information message to the client from the first motion video camera, the format information message including data identifying a plurality of formats in which the first motion video camera may deliver a motion video, and receiving at the first motion video camera after sending the format information message, the second request from the client, the second request including data identifying the requested format selected from the plurality of formats in the format information message. One advantage of presenting a list of possible formats is that the chances of the requested video being possible to playback by the client increases due to the fact that a client in many cases is able to decode a plurality of formats and that the process therefore is not limited to one by the client initially requested format, but that the client may adapt in accordance with the available formats.

In another embodiment the sending of a format information message further comprises the act of generating the format information message from a transcoding list relating to the first motion video camera.

In yet another embodiment the motion video requested for delivery is identified in the first request and the act of generating the format information message includes identifying the present format of the requested motion video and generating the format information message based on the formats registered in the transcoding list that are possible to transcode into considering the identified present format of the requested motion video. In this way the transcoding formats sent to the client for selection are limited to the transcoding formats that are relevant and hence bandwidth is saved and processing power in the client is saved.

According to one embodiment the identified requested motion video is stored in the first motion video camera.

In another embodiment the identified requested motion video is stored in a networked storage and the identified requested motion video is related to the first motion video camera.

In one embodiment the identification in the request identifying the motion video to be delivered is a time point at which the motion video to be delivered starts.

In a another embodiment the method further comprises the act of identifying the motion video to be delivered by identifying a motion video captured by the first motion video camera, being the camera that the client is requesting the motion video from, and wherein the motion video is captured at a time point specified in one of the first and the second requests.

According to another aspect of the invention a motion video camera comprises a list including addresses to transcoding devices, decoding format entries identifying formats the transcoding devices are able to decode, and encoding format entries identifying formats the transcoding devices are able to encode, a network interface arranged to allow communication to and from the motion video camera via a network, a processor arranged to identify an address to a transcoding device in said list based on the format of a requested motion video and an indication of a desired format of the requested video. One advantage of the transcoding list is that the capabilities, at least relating to providing different video formats, are increased. This increase may be achieved without changing the operation of a client relating to accessing the motion video camera that captures/captured the motion video of interest. Another advantage is that the system may become distributed in view of transcoding. Thereby, the transcoding list is also enabling redundancy when it comes to transcoding. Another advantage is that the capabilities of a motion video camera may be extended without making great changes to the motion video camera and/or the client.

In one embodiment the motion video camera further comprises a memory device storing said list.

In another embodiment the motion video camera further comprises a memory device storing motion video data captured by the motion video camera.

In yet another embodiment the address to a transcoding device is a network address.

According to one embodiment the motion video camera further comprises a format information message generator arranged to generate a format information message to be sent over the network to a client requesting a motion video, said format information message include formats that the motion video camera are able to deliver in view of the format of the present version of the requested motion video. One advantage of making the motion video camera send a customised format information message, in view of the formats it is able to deliver given a specific format of the original, is that the client get a broader selection base for the requested motion video format than if the client only had information of its own capabilities.

According to another aspect of the invention a method for updating transcoding capabilities of a motion video camera comprises connecting a transcoding device to a network connected to the motion video camera, sending from the transcoding device to the motion video camera information of transcoding capabilities of the transcoding device, updating transcoding capabilities of the motion video camera with transcoding capabilities included in the information sent from the transcoding device. One advantage of the updating method above is that the capabilities of motion video cameras in the system may be updated or increased by simply installing another device in the system.

In one embodiment the information of transcoding capabilities of the transcoding device includes video formats that the transcoding device is arranged to decode and video formats that the transcoding device is arranged to encode.

In another embodiment the transcoding device is another motion video camera. The advantage of making the transcoding device a motion video camera is that there is no need for a separate device, but a device that is to be used in the system anyway may be installed.

In yet another embodiment the sending of the information of transcoding capabilities is performed by broadcasting over the network a message including the information of transcoding capabilities. The advantage of this is that the process of extending the capabilities of the system is facilitated.

In one embodiment the method further comprises the act of the motion video camera sending a list of its own transcoding capabilities to said transcoding device in response to receipt of the list of transcoding capabilities of the transcoding device. The advantage of this embodiment is that the capabilities are distributed over the network. This also results in some redundancy.

In another embodiment a second motion video camera is connected to the network connecting said motion video camera and said method further comprises sending of information of transcoding capabilities of the transcoding device from the transcoding device to the second motion video camera and updating transcoding capabilities of the second motion video camera with transcoding capabilities included in the information sent from the transcoding device.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION OF THE PREFERRED EMBODIMENTS

Figure 1:
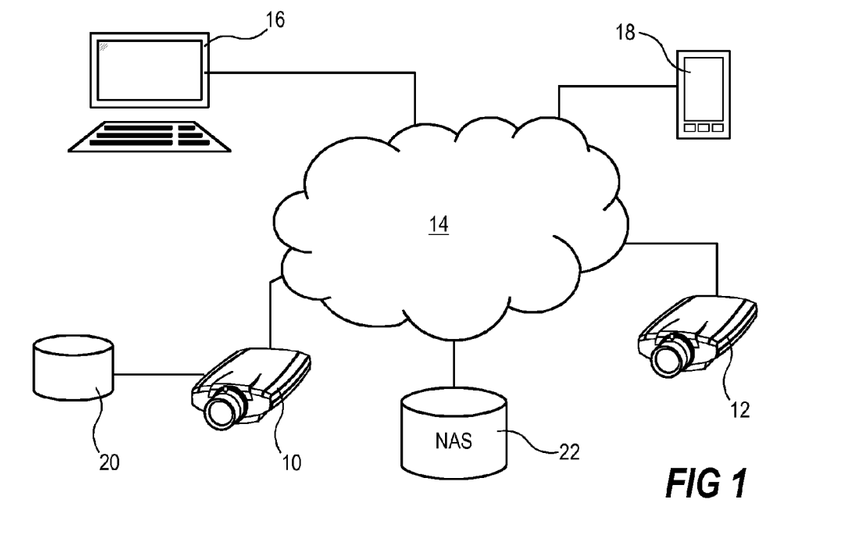
FIG. 1 shows a schematic block diagram of a networked system in which an embodiment of the invention may be implemented.

In FIG. 1 a system in which an embodiment of the invention may be implemented is described. The system includes network enabled motion video cameras 10, 12, connected to a network 14. Further, one or a plurality of clients 16, 18, is arranged to be connected to any camera 10, 12 via the network 14 in order to request motion video from respective camera 10, 12. Moreover, motion video data may be stored in respective motion video camera 10, 12. However the system may alternatively or complementary include external storage 20, 22, storing motion video from the motion video cameras 10, 12. The external storage may be a storage device 20 directly connected to a motion video camera, 10, or a networked storage device 22 accessed via the network 14.

The network 14 may be any type of network that allows electronic devices to exchange data. The network may be wired, wireless or any combination thereof. It may be implemented by means of any known network protocol allowing the exchange of data between the electronic devices of the system, e.g. Ethernet (IEEE 802), Internet Protocol (IP) combined with TCP, UDP, or FTP, Synchronous optical networking (SONET), Synchronous Digital Hierarchy (SDH), Asynchronous Transfer Mode (ATM), etc. The system may be implemented using any size network, e.g. a Local Area Network (LAN) or a Wide Area Network (WAN).

The external storage device 20 directly connected to a motion video camera 10 may for instance be a memory card, e.g. a Compact Flash card, a Memory Stick, a Secure Digital (SD) card, etc., may be a USB flash drive, an external hard drive connected directly to the camera, etc. Recorded motion video files captured by the camera may then be stored on these devices. The motion video camera may alternatively or complementary include an internal memory, e.g. a non-volatile memory such as a flash memory, or an internal hard drive, for storing recorded motion video.

The networked storage device 22 may be any kind of storage device that is managing storage of data received directly over a network. Some examples of such devices are Networked Attached Storage (NAS) devices, file servers, Storage Area Network (SAN) devices, etc.

The client 16, 18, in the system is a device that a user or an operator may use in order to access and view live or recorded motion video from a motion video camera 10, 12, in the system. The client 16 may for instance be a computer, e.g. a lap top, a desk top, a PC, a workstation, a dedicated surveillance computer, a general computer, etc. The client 18 may also be a smaller and probably less powerful computer, e.g. a mobile phone, a PDA, a tablet, etc. Independent on the hardware of the client, the client is running software designed for requesting motion video over a network. In many cases the number of formats that the client is able to decode is limited. Moreover, the client may also have restrictions relating to image resolution, frame rate, colour space, etc.

The motion video camera 10, 12, may be any type of network enabled motion video camera 10, 12, i.e. a camera which is arranged to capture motion video and which is enabled to communicate over a computer network, as described above. Now referring to FIG. 2, wherein one embodiment of a motion video camera 10 is showed. The motion video camera 10 includes devices and software code for capturing motion video, e.g. a lens 50 to focus light from a scene that is to be captured onto an image sensor 52, a signal processing device 54, an image processing device 56, and a video encoder 58. Moreover the motion video camera 10 includes devices not necessarily involved in the capturing of motion video, e.g. a processing unit 60, a volatile memory 62, a non-volatile memory 64, a network interface 66, and a storage interface 68. According to this embodiment a video decoder 70 is included as part of a transcoding functionality of the motion video camera 10. The decoder may be directly connected to the video encoder 58 or the operational connection in relation to a transcoding operation may be via an internal memory, e.g. the volatile memory 62 or the non-volatile memory 64. The motion video camera 10, 12, may also include a webserver 74 or any other type of server device enabling direct access to the motion video camera, its live stream, and/or the recorded motion videos of the motion video camera 10, 12.

Figure 2:
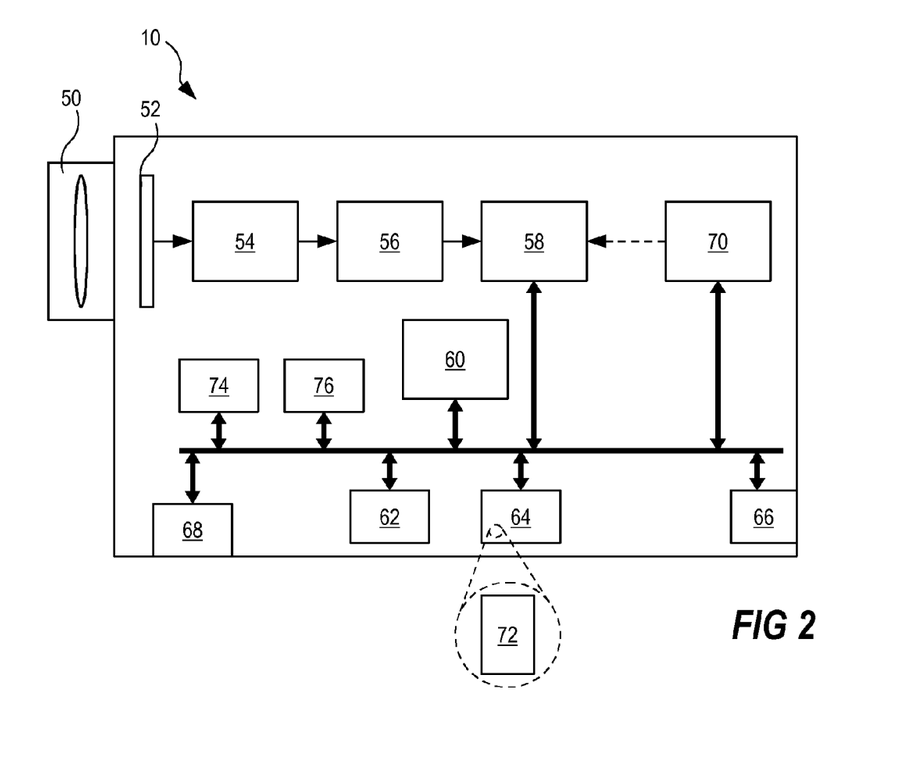
FIG. 2 shows a schematic block diagram of a motion video camera according to one embodiment of the invention.

Further, the motion video camera includes a transcoding list 72 which may be stored in the non-volatile memory 64. The transcoding list 72 includes information of which formats the decoder 70 of the camera 10 is capable of decoding, i.e. both container format and encoding format, and information of which formats the encoder of the camera 10 is capable of encoding, i.e. both container format and encoding format. The formats of the list may also include information relating to the capability of encoding and/or decoding various aspect ratios, image resolutions, image sizes, motion video frame rates etc. Moreover, the transcoding list 72 includes information of encoding and/or decoding capabilities of devices, e.g. other motion video cameras, connected to the motion video camera 10 over the network and which devices are arranged to accept a transcoding request from the motion video camera.

Moreover, the motion video camera 10, 12 may include a format information message generator 76 arranged to generate a format information in response to a motion video request from another device, e.g. a client 16, 18 message and based on the format of the requested motion video in view of the entries in the transcoding list. According to one embodiment the information message generator 76 is implemented by means of program codes stored in any of the memories 62, 64 and executed by the processing unit 60.

The processing unit 60 is arranged to run program code stored in the internal memory, e.g. volatile memory 62 and/or non-volatile memory 64. Moreover, the processing unit 60 may be arranged to process data relating to image and/or motion video processing, e.g. encoding and/or decoding may be processes in the processing unit 60 instead of separate devices. The processing unit may also be arranged to run software implementing the server 74 of the camera.

The storage interface 68 may be a card slot including appropriate connectors for a memory card, e.g. a Compact Flash card, a Memory Stick, a Secure Digital (SD) card, etc. However, the storage interface may also be a cable connector, e.g. USB-connector (Universal Serial Bus), serial connector, parallel connector, PCI connector, ePCI connector, SATA connector, eSATA connector, mSATA connector, etc., for connecting the camera directly to an external storage device 22 via said cable. The motion video camera 10 may store motion video or any other data onto these external storage media.

The transcoding list 72 includes, as mentioned previously, information of the motion video formats that the motion video camera 10 may decode from and the formats that motion video camera 10 may encode to. Moreover, the transcoding list includes information of motion video formats that the motion video camera 10 may decode from and/or encode to by means of another device connected via the network 14. An entry in the transcoding list 72 may be seen as specifying possible source encoding profiles and possible output encoding profiles, with additional functions that can be applied to streamed or stored data. Such an entry may also be related to an address or other identifier identifying where the operations are to be performed.

Figure 3:
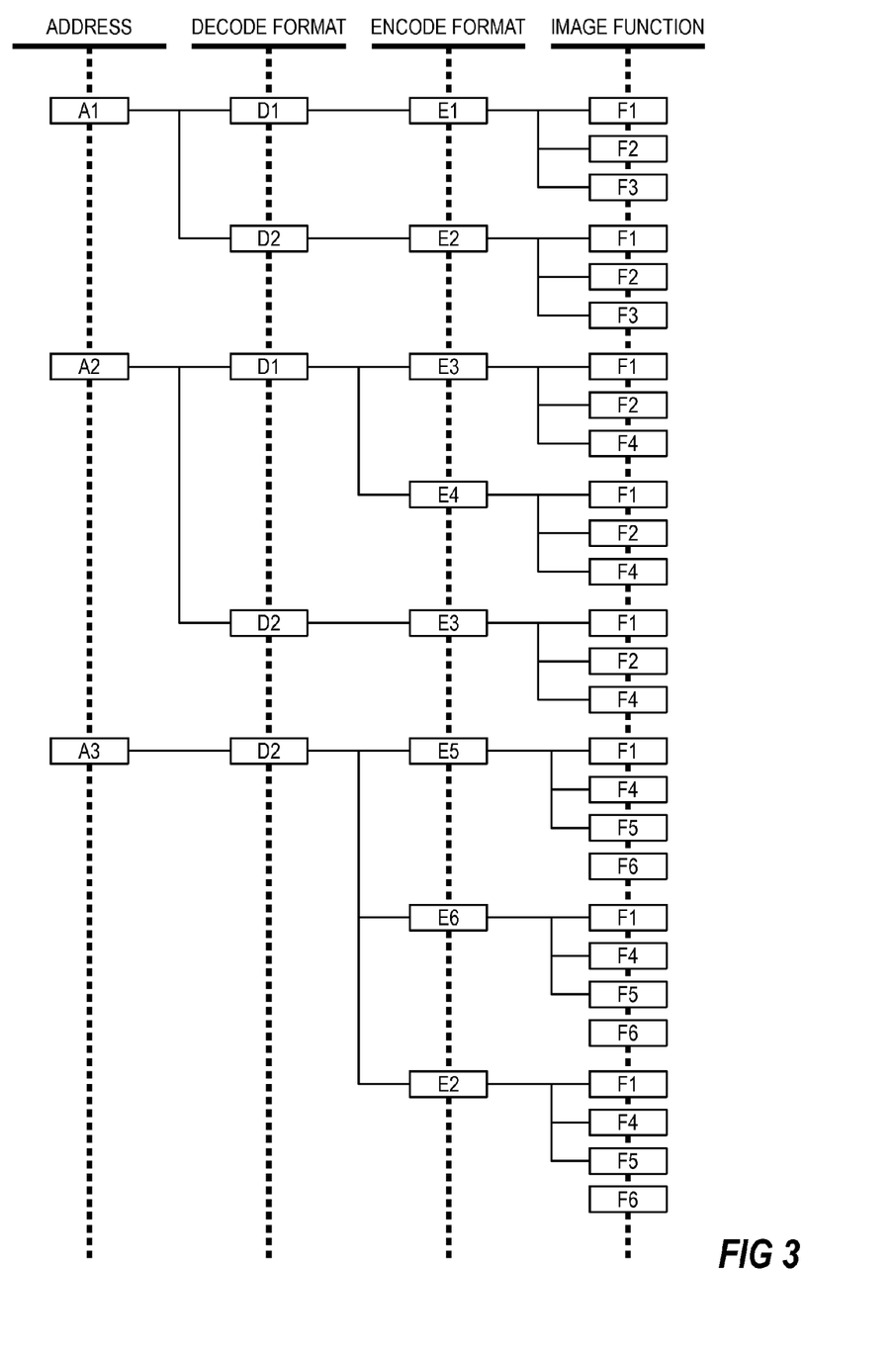
FIG. 3 shows a schematic diagram of the contents of transcoding information stored in a motion video camera according to the invention.

According to one embodiment of the invention, motion videos requested in a format that requires transcoding by another device than the motion video camera itself is sent to that device for transcoding and then returned to the motion video camera for delivery to the client requesting the motion video. One example of the structure of the transcoding list 72 is showed in FIG. 3. The example structure in FIG. 3 is a tree structure, however, the structure of the data may be a simple table, a list, or structured as a complex database. Referring to FIG. 3 the transcoding list may include information A1-A3 identifying each device contributing with capabilities, including the motion camera itself. The information used for identifying the devices contributing with capabilities may be network addresses. For each device decoding formats that they are able to decode D1-D2 are stored. The decoding formats registered for a contributing device may be the formats that are most relevant in view of the motion camera itself and its decoding and encoding capabilities and the capabilities of the other devices. In FIG. 3 encoding E1-E6 capabilities are related to decoding capabilities. However, in some implementations it is enough to relate encoding capabilities to respective device. Further, in the tree structure of FIG. 3 image functions are related to each encoding decoding pair. These image functions are functions used for altering the presentation of the image frames, e.g. aspect ratio, resolution, colour correction, bitrate control, or they are functions for video analytics, e.g. generating scene descriptions. Further, the transcoding list may include a ranking value or a cost value identifying various metrics enabling the motion video camera or the client to determine the most suitable or effective transcoding entry.

In the example of FIG. 3 the reference A1 is identifying the motion video camera storing the transcoding list, i.e. the motion video camera itself. The transcoding list 72 then indicates that the motion video camera itself is capable of decoding two formats D1 and D2 and that D1 may be encoded into E1 and D2 may be encoded into E2. Image functions F1-3 may be applied to any of these decoding processes. The reference A2 may refer to an external transcoding capable device which is registered as being capable to decode format D1, encode such decoding into E3 or E4, and applying functions F1, F2 or F4 to the motion video. According to the list of FIG. 3, A2 is also capable of decoding format D1, encoding it into E3, and applying functions F1, F2, or F4. In the example given in FIG. 3 a second external transcoding device is identified and it is registered to decode D2, encode it into E5, E6 or E2, and applying functions F1, F4, F5, or F6.

Accordingly A3 is registered to decode D2 and encode it into E2, which A1 itself is capable of and therefore such an entry would be redundant. However, A3 is capable of applying other functions than A1 and hence this decoding—encoding pair may add to the system functionality as a whole.

When a post in the transcoding list 72 is to refer to the motion video camera 10 itself, this may be achieved by including the address of the motion video camera 10 itself or by using a special predefined indicator that the system understands as meaning the motion video camera 10 itself, e.g. such indicator may be a specific character, number, or indication code.

According to an alternative embodiment, the structure of the transcoding list 72 may be visualised as a table having different posts, i.e. rows, for each transcoding capability and in which the columns represents the entries going into a post.

Motion video cameras are often arranged in a surveillance system or in a monitoring system in which each camera has a designated area or scene to capture images of, survey, and/or monitor. The motion video cameras of the system may provide live motion video, i.e. deliver motion video of events substantially at the same moment as the event occur, and they may store motion video of events. The capturing and storage of motion video of particular events may be triggered by detectors or by schedules. Various detectors or detection schemes are known to the skilled person, e.g. motion detection using a motion sensor or video analytics, trip wire detection using external sensors or video analytics, etc.

The motion video captured by the camera and stored for later viewing may be stored in the internal memory of the motion video camera 10, e.g. the non-volatile memory. However, the internal memory of the motion video camera 10 has rarely the capacity to store motion video of any longer time period and/or quality. In order to overcome this said camera is equipped with external storage capabilities 20, 22 as discussed above.

In the case of an operator of a client want to view a live motion video or a stored motion video originating from the motion video camera 10, the client will request the video from the motion video camera by sending a request to the camera. In response to the request the motion video camera will send the requested motion video.

Figure 4:
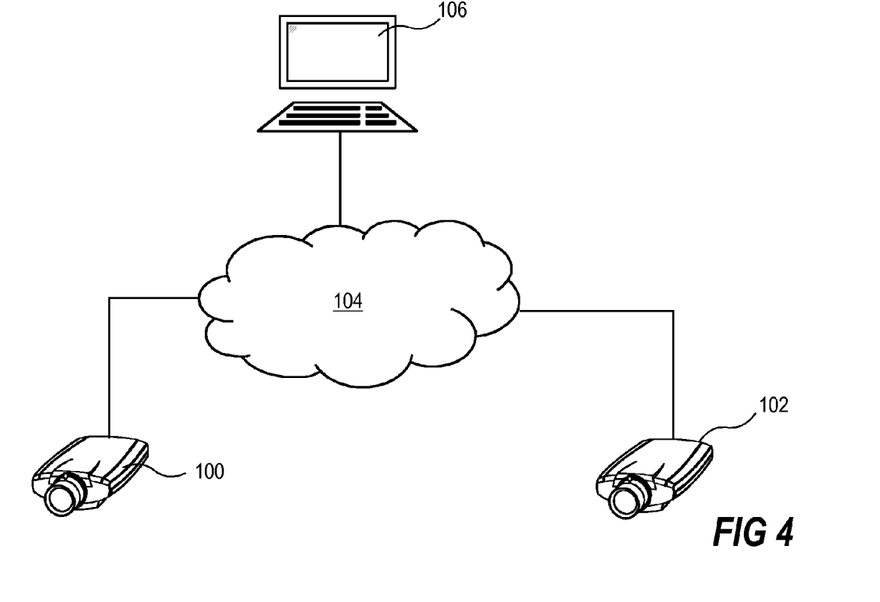
FIG. 4 shows a schematic block diagram of parts of a system referred to in FIGS. 5-8.

Now referring to the system showed in FIG. 4 showing a surveillance system including two motion video cameras 100, 102 each implementing at least part of one embodiment of the invention. The cameras 100 and 102 are connected, as discussed above, to each other via a network 104. The network and the cameras may be identical to the network and cameras described in connection with FIG. 1. The cameras 100 and 102 may implement any of the previously described external storage strategies and may be provided with a card slot or a connection for connecting an external storage device to the camera or may implement a storage process for storing on a networked attached storage NAS, not shown in FIG. 4. Further, a client 106 is connected to the network and arranged to be used for viewing motion video from the cameras 100 and 102.

Figure 5:
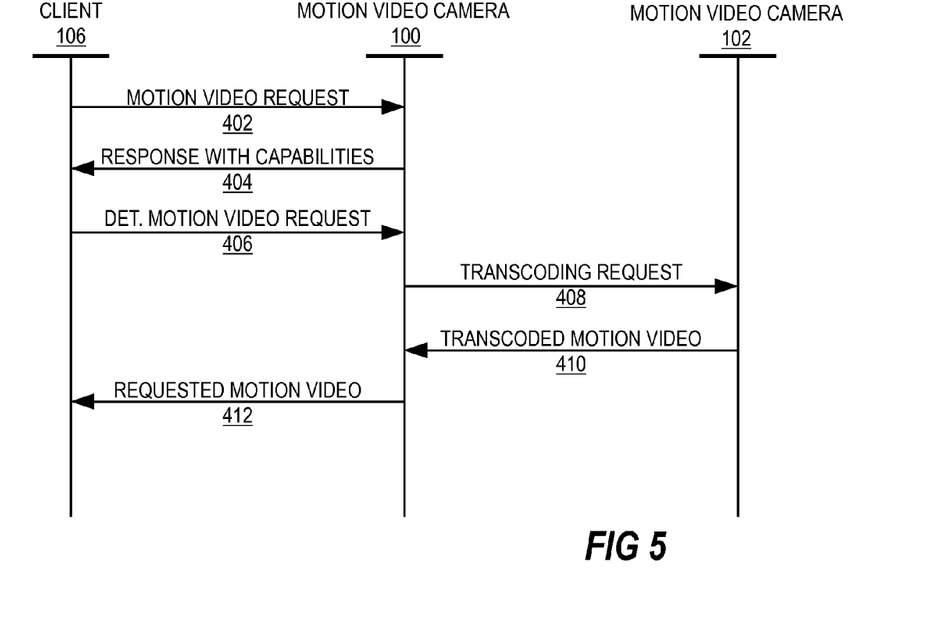
FIG. 5 is a timing diagram representing the signalling between devices in FIG. 4 operating according to one embodiment of the invention.

In FIG. 5 a timing diagram showing the communication between the devices in FIG. 4 from a request by the client 106 for a motion video recorded by motion video camera 100 to the delivery of the motion video to the client 106 of one example embodiment of the invention. The communications starts with a request for motion video 402 from the client 106 to the motion video camera 100. This request for motion video 402 includes an indication that the client 106 would like to retrieve a motion video from the motion video camera 100 and an identification of the video that is requested. In response to the motion video request 402 the motion video camera 100 sends an format information message 404 to the client 106, said information message includes information of the formats that the motion video camera 100 is able to deliver based on the format of the requested video streamed from or stored by the motion video camera 100. When the client 106 has processed this information, it sends a detailed request 406 including information of the desired format for the requested motion video to be delivered in. The full request is then processed by the motion video camera 100 and if the motion video has to be transcoded into a format not possible to achieve by the motion camera 100 itself, then the motion camera 100 sends a transcoding request 408 to a second motion video camera 102 connected to the network 104. The transcoding request 408 includes information of the desired format and the motion video data to transcode. This transcoding message 408 is not necessarily sent in one single information message. The motion video data that has been transcoded by the second motion video camera 102 is then returned 410 to the motion video camera 100 which simply relays the transcoded motion video 412, now in the format requested by the client 106, to said client 106. The requested motion video may be stored or live motion video. Moreover, the motion video may be streamed to the client, independent if the motion video is stored or live, or it may be sent as a file.

Figure 6:
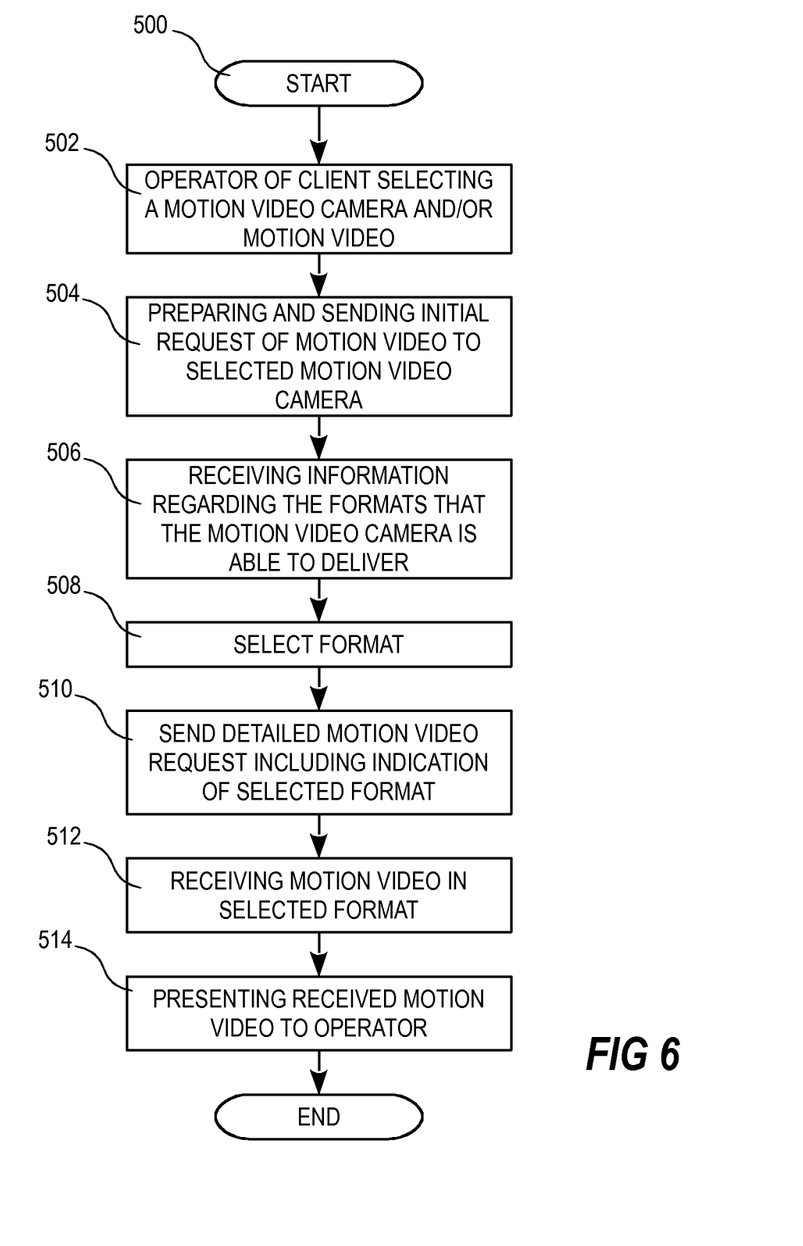
FIG. 6 is a flowchart schematically describing the process of the client operating in the system configuration of FIG. 4 according to one embodiment of the invention.

The process of the client 106 in accordance with one embodiment of the invention is showed in the flowchart of FIG. 6. The process starts by the operator selecting on the client 106 a motion video camera 100 and/or a motion video, step 502. The selection of the motion video may be made at this step in case that the formats of the motion videos recorded by the motion video camera 100 varies or if the format between recorded and live motion video differs. Otherwise, the selection of the video should not influence the offer that the motion video camera will be able to present. According to one embodiment the act of selecting a video may include selecting a specific motion video camera that made the recording and a point in time. In another embodiment the act of selecting a motion video includes selecting the motion video camera and, if the motion video camera is able to deliver both recorded motion video and live motion video, selecting live motion video. A motion video request is then prepared and sent by the client 106, step 504, to the motion video camera 100 selected by the operator in step 502. In return the client 106 receives information regarding the formats that the motion video camera 100 is able to deliver, step 506. Then the client 106 selects a suitable format from the information received, step 508, and send a detailed motion video request to the motion video camera 100, step 510. The selection of format may be performed by means of an algorithm or by the operator. The detailed motion video request includes an indicator of the selected format. Further, if the motion video desired has not been identified in the earlier request it may be identified in this request. Even if the motion video has been identified in the previous request it may be identified in this request as well. The motion video is then delivered to and received by the client 106 in the requested format, step 512, and the client 106 decode the motion video and present it to the operator, step 514.

Figure 7:
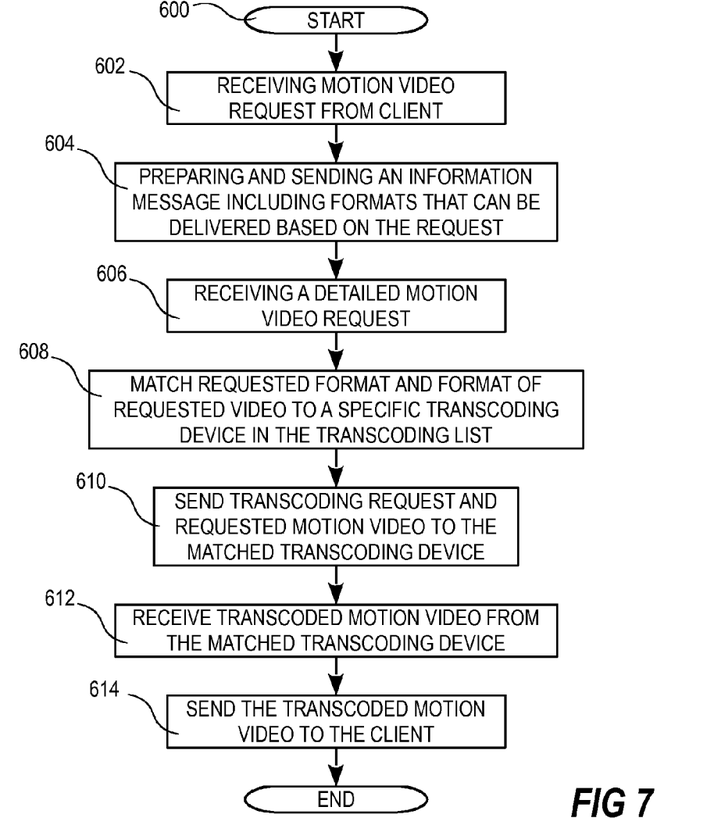
FIG. 7 is a flowchart schematically describing the process of a first motion video camera operating in the system configuration of FIG. 4 according to one embodiment of the invention.

In the motion video camera 100 a corresponding process for taking care of the motion video request is performed 600, see FIG. 7. The process starts by receiving a motion video request from a client 106, step 602. In response to the motion video request the motion video camera 100 prepare an format information message including a list of formats that the motion video camera 100 can deliver based on the information in the motion video request, step 604, e.g. in the generation of the format information message the present format of the request motion video may be considered. The list of formats that can be delivered may include all the formats that the motion video camera 100 is able to deliver by itself and/or by assistance from other transcoding enabled devices, e.g. the second motion video camera 102. If the request includes information identifying the motion video requested or if the request identify that the live stream of the motion video camera is requested, then the motion video camera is able to figure out the original format of the video requested and based on this information the motion video camera 100 can check the transcoding list of the motion video camera 100 and generate a list of formats into which a motion video of the given format may be transcoded by means of the motion video camera 100.

When this information message has been sent the motion video camera 100 will receive a detailed motion video request including a requested format selected from the list previously sent by the motion video camera 100, step 606. This detailed motion video request may include an identifier of the requested motion video. However, if this information was received previously this information may be left out in this detailed motion video request.

Then the motion video camera 100 matches the requested format and the format of the requested motion video to a transcoding device 102, step 608. The matching may include finding a device in the transcoding list that is able to decode the format of the requested motion video and that is able to encode to the requested format. The transcoding device 102 may be identified by means of an address which may be used for a transcoding request. A transcoding request is then sent to the matched transcoding device 102, step 610. The transcoding request may include an indicator of the requested resulting format and the motion video to transcode. Finally, the transcoded video is received from the transcoding device 102, step 612, and is passed on in a response to the client 106, step 614. The steps 610, 612, and 614 may include streaming the motion video data to the transcoding device 102, transcode on the fly, receive a stream of transcoded motion video data and then forward the stream of motion video data to the client 106. These steps may alternatively be performed on files which are fully processed in each step before the next step is performed.

Figure 8:
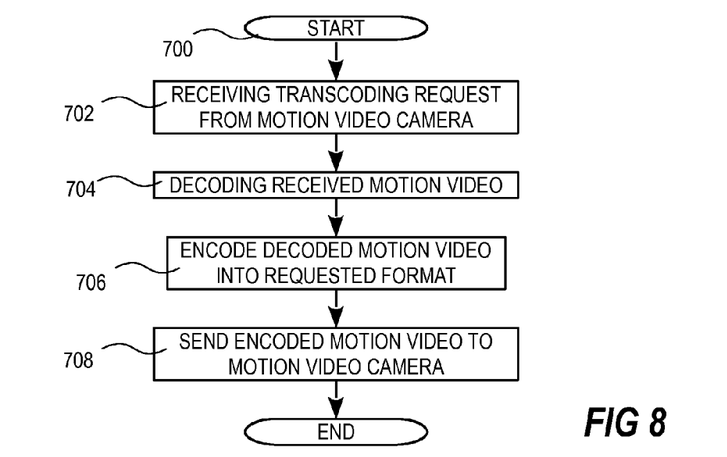
FIG. 8 is a flowchart schematically describing the process of a second motion video camera operating in the system configuration of FIG. 4 according to one embodiment of the invention.

The process 700 of the transcoding device, which is represented in FIGS. 3 and 4 by a motion video camera 102, is showed in FIG. 8. The motion video camera 102 receives a transcoding request from the first motion video camera 100, which is the video camera that received the request for a motion video, step 702. The received motion video is decoded, step 702, and then encoded into the requested format, step 706. The encoded motion video, now transcoded from the original format, is sent back to the first motion video camera 100. The received motion video of step 702 may be streamed motion video data which is decoded, encoded, and streamed back to the first motion video camera 100. The decoding and encoding may be performed on the motion video stream on the fly, i.e. streamed motion video data is decoded as soon as it is received and then consecutively encoded and streamed back before the transcoding device 102 has stopped receiving motion video data relating to the same motion video data stream. However, the motion video data exchange may also be performed by means of a file that is fully received in the transcoding device 102 before any transcoded motion video data is returned to the requesting motion video camera 100.

Figure 9:
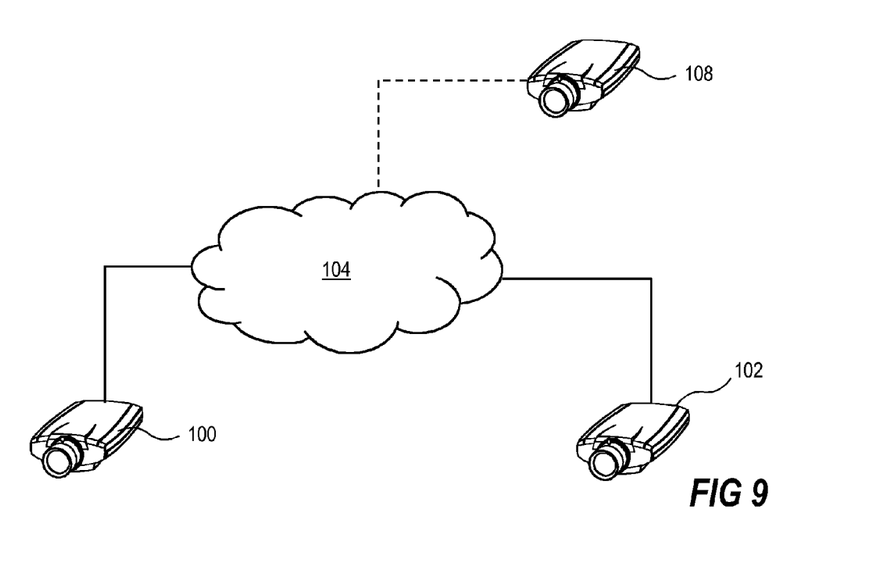
FIG. 9 shows a schematic block diagram of a motion video camera getting connected to the network of the system according to one embodiment of the invention.
Figure 10:
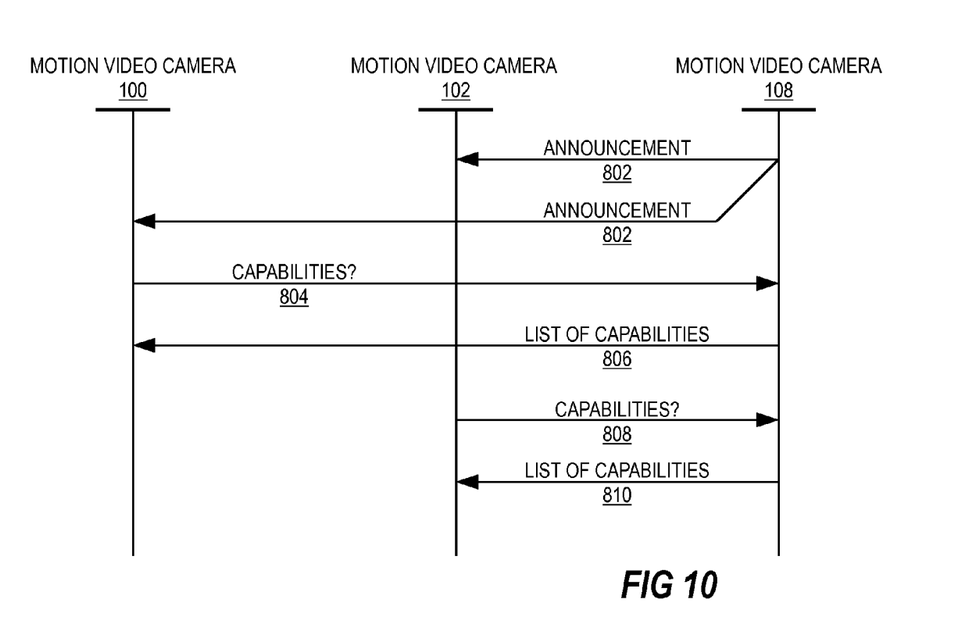
FIG. 10 is a timing diagram representing the signalling between devices in FIG. 9 operating according to one embodiment of the invention Further, in the figures like reference characters designate like or corresponding parts throughout the several figures.

According to another aspect of the invention a device having transcoding capabilities and which is being connected to a network which already includes devices enabled to utilise transcoding by other devices than themself and/or to transcode themself is registered in the other devices. The registration may start automatically, when the device is connected to the network, by broadcasting a query over the network in order to discover other devices enabled to operate in a transcoding scheme as described herein. Each device detecting such a query may respond by sending a message to the new device, the message including a network address of the responding device. Then the new device may send a list of capabilities to the responding device. Such a list may include decoding and encoding capabilities of the device. Alternatively, the new device broadcasts the list and its address when it is connected to the network and the devices that are enabled to operate in a transcoding scheme as described herein. In order to facilitate the understanding of this aspect of the invention an example referring to FIG. 9 and FIG. 10 will be presented below. A motion video camera 108 to be added to the network 104 is configured to operate as a transcoding device in accordance with the present invention. When the motion video camera 108 is being connected to the network already connecting a first motion video camera 100 and a second motion video camera 102, which both also are configured to operate in accordance with the present invention an announcement message 802 is sent. The announcement message 802 is sent for any transcoding enabled device to read when the added motion video camera 108 is connected to the network 104. The message may be sent either automatically or by pressing of a button on the motion video camera 108. The announcement message 802 includes an identifier, e.g. a network address, of the added motion video camera 108. The announcement message 802 may also include a list of formats that it is able to decode and that it is able to encode. However, in this example this information is not provided in the announcement message 802. When the motion video camera 100 detect the announcement message 802 the motion video camera 100 extract the address and send a capability request 804 to the motion video camera. This capability request 804 provides the motion video camera 108 with the network address of the motion video camera 100. The capability request 804 may also include a list of capabilities of the motion video camera 100. When the motion video camera 108 receives the capability request 804 it sends a list of its capabilities 806 to the address presented in the request for capabilities. The list of capabilities is then received in the motion video camera where it is analysed and relevant capabilities are connected to the address of the motion video camera 108 and are added to the transcoding list of the motion video camera 100. Corresponding messages 808 and 810 are sent between motion video camera 102 and motion video camera 108.

An alternative way of achieving the same possibilities of transcoding is to have the motion video camera from which the motion video is originating to present transcoding alternatives, similar to the process described above. However, instead of having the motion video camera requesting the transcoding the motion video camera provide the client with addresses to suitable transcoding devices and an address to the motion video to be transcoded. The client then selects a suitable transcoding device and sends a request to the transcoding device of transcoding the motion video at a specific address to a specific format, the specific address and the specific format is presented in the request. Then the transcoding device retrieves the motion video data, transcodes it, and sends the transcoded motion video data to the client. This scheme is applicable on both streaming motion video data and on motion video files.

What is claimed is:

1. A method for delivering motion video, which is captured by a first networked video surveillance camera, to a computer from said first networked video surveillance camera, said method comprising:

receiving, at the first networked video surveillance camera from the computer, a request of a motion video captured by the first networked video surveillance camera and an indication of a requested format, wherein the first networked video surveillance camera does not support the requested format of said motion video captured by the first networked video surveillance camera;

matching, in a transcoding format list in the first networked video surveillance camera, the requested format of the motion video captured by the first networked video surveillance camera to an address of a second networked video surveillance camera, wherein the first networked video surveillance camera and the second networked video surveillance camera are connected in a video surveillance system, wherein the second networked video surveillance camera supports the requested format of said motion video captured by the first networked video surveillance camera;

sending, to said address of the second networked video surveillance camera, the motion video captured by the first video surveillance camera identified in the request from the computer for transcoding the motion video to the requested format, the motion video captured by the first networked video surveillance camera having a format different from the requested format from the computer;

receiving, at the first networked video surveillance camera from the second networked video surveillance camera, said requested motion video captured by the first networked video surveillance camera in the requested format, wherein the second networked video surveillance camera transcodes the motion video captured by the first networked video surveillance camera into the requested format; and sending, from the first networked video surveillance camera and to the computer, said requested motion video captured by the first networked video surveillance camera in the requested format.

2. The method according to claim 1, wherein said receiving at the first video surveillance camera from the computer includes receiving the request of the motion video in a first request and the indication of the requested format in a second request, and said method further comprising:
sending, in response to receiving the first request, a format information message to the computer from the first video surveillance camera, the format information message including data identifying a plurality of formats in which the first video surveillance camera may deliver the motion video; and
receiving at the first video surveillance camera, after sending the format information message, the second request from the computer, the second request including data identifying the requested format from the plurality of formats in the format information message.

3. The method according to claim 1, wherein the sending the format information message further comprises generating the format information message from a transcoding list relating to the first video surveillance camera.

4. The method according to claim 3, wherein the motion video requested for delivery is identified in the first request and the generating the format information message includes identifying the present format of the requested motion video and generating the format information message based on the formats registered in the transcoding list as being possible to transcode into considering the identified present format of the requested motion video.

5. The method according to claim 1, wherein the identified requested motion video is stored in the first video surveillance camera.

6. The method according to claim 1, further comprising identifying the motion video to be delivered by identifying a motion video captured by the first video surveillance camera, being the camera that the computer is requesting the motion video from, and wherein the motion video is captured at a time point specified in one of the first and the second requests.

7. A video surveillance camera comprising:
a camera arranged to capture a motion video;
a list including addresses to video surveillance cameras, decoding format entries identifying formats the video surveillance cameras are able to decode, and encoding format entries identifying formats the video surveillance cameras are able to encode;
a network interface arranged to allow communication to and from the video surveillance camera via a network, wherein the communication includes receiving a request of the motion video and an indication of a requested format of the motion video, wherein the video surveillance camera does not support the requested format of the motion video captured by the video surveillance camera, wherein the video surveillance camera is connected to one or more video surveillance cameras in a video surveillance system via the network; and
a processor arranged to identify an address to a video surveillance camera in said list based on a format of the motion video captured by the video surveillance camera and the indication of the requested format of the motion video when the motion video captured by the motion video camera has a format different from the requested format, wherein the identified video surveillance camera supports the requested format of the motion video captured by the video surveillance camera,
wherein the network interface and the processor are further arranged to send, to said address of the identified video surveillance camera in said list, the requested motion video captured by the video surveillance camera and to receive, from said address of the identified video surveillance camera in said list, the requested motion video captured by the video surveillance camera in the requested format, wherein the identified video surveillance camera transcodes the motion video captured by the video surveillance camera into the requested format,
wherein the network interface and the processor are further arranged to send, from the video surveillance camera to a computer, the requested motion video captured by the video surveillance camera in the requested format.

8. The video surveillance camera according to claim 7, further comprising a memory device storing said list.

9. The video surveillance camera according to claim 7, further comprising a memory device storing motion video data captured by the video surveillance camera.

10. The video surveillance camera according to claim 7, further comprising a format information message generator arranged to generate a format information message to be sent over the network to the computer requesting a motion video, said format information message include formats that the video surveillance camera is able to deliver in view of the format of the present version of the requested motion video.

* * * * *